United States Patent
Endress et al.

(10) Patent No.: US 7,336,320 B2
(45) Date of Patent: Feb. 26, 2008

(54) METHOD AND APPARATUS FOR TEMPORALLY RECURSIVE CHROMINANCE SIGNAL NOISE REDUCTION

(75) Inventors: Wolfgang Endress, Villingen-Schwenningen (DE); Ingo Doser, Donaueschingen (DE); Günter Anton Grimm, Deisslingen (DE)

(73) Assignee: Thomson Licensing, Boulogne, Billancourt (FR)

( * ) Notice: Subject to any disclaimer, the term of this patent is extended or adjusted under 35 U.S.C. 154(b) by 459 days.

(21) Appl. No.: 10/969,529

(22) Filed: Oct. 20, 2004

(65) Prior Publication Data

US 2005/0083439 A1    Apr. 21, 2005

(30) Foreign Application Priority Data

Oct. 21, 2003   (EP) .................................. 03090358

(51) Int. Cl.
*H04N 5/21* (2006.01)
(52) U.S. Cl. ........................ 348/624; 348/620; 348/607
(58) Field of Classification Search ................ 348/607, 348/612, 620–624, 702; 382/265, 275; H04N 5/21, H04N 5/213
See application file for complete search history.

(56) References Cited

U.S. PATENT DOCUMENTS

| | | | |
|---|---|---|---|
| 4,240,106 A | 12/1980 | Michael et al. | |
| 4,639,784 A * | 1/1987 | Fling | 348/620 |
| 5,276,512 A * | 1/1994 | Onda | 348/620 |
| 5,367,340 A * | 11/1994 | Spencer | 348/607 |
| 6,259,489 B1 * | 7/2001 | Flannaghan et al. | 348/620 |
| 6,714,258 B2 * | 3/2004 | Stessen et al. | 348/607 |

FOREIGN PATENT DOCUMENTS

EP    0 300 822 A1    1/1989

OTHER PUBLICATIONS

Search Report.
EP 1 032 196A (OEC Medical Systems Inc.) Aug. 30, 2000 *column 2, line 31-line 18 * * figures 1,2 * *column 4, line 31-line 41 *.
Brailean J.C. et al: "Noise Reduction Filters For Dynamic Image Sequences: A Review" Proceedings of the IEEE, IEEE. New York, US vol. 83 No. 9, Sep. 1, 1995 p. 1272-1291, XP000526001 ISSN: 0018-9219 *p. 1276, colum 1-column 2*.

* cited by examiner

*Primary Examiner*—Sherrie Hsia
(74) *Attorney, Agent, or Firm*—Joseph J. Laks; Vincent E. Duffy; Michael A. Pugel

(57) ABSTRACT

A temporally recursive chrominance signal noise reduction can be achieved by subtracting a delayed version of the chrominance output signal from the chrominance input signal and by multiplying the related difference signal by a variable share factor and adding the resulting signal to the chrominance output signal, for achieving different degrees of noise reduction. From the difference signal a motion representative value and a value representing the presence of a smear effect are calculated and used to calculate the variable factor. After having been multiplied by this factor, the difference signal is combined with a frame-delayed version of the chrominance output signal in order to form the noise-reduced chrominance output signal.

10 Claims, 2 Drawing Sheets

METHOD AND APPARATUS FOR TEMPORALLY RECURSIVE CHROMINANCE SIGNAL NOISE REDUCTION

FIELD OF THE INVENTION

This application claims the benefit, under 35 U.S.C. 119, of European patent application No. 03090358.7 filed 21 Oct. 2003.

The invention relates to a method and to an apparatus for temporally recursive chrominance signal noise reduction, wherein a delayed version of the chrominance output signal is subtracted from the chrominance input signal.

BACKGROUND OF THE INVENTION

There are several types of video chrominance noise reduction. Their disadvantages are that spatial noise reduction algorithms tend to soften the details of the picture content, i.e. they reduce the horizontal and/or vertical resolution, whereas temporal and temporal recursive noise reduction algorithms tend to smear (i.e. reduction of temporal resolution).

SUMMARY OF THE INVENTION

In case of temporal recursive noise reduction, such smear effect is in particular visible at flat fast moving chroma areas if at the same time medium to strong noise reduction processing is present.

A problem to be solved by the invention is reducing smear effects in temporal recursive chroma noise reduction. The inventive chroma noise reduction is based on a motion adaptive temporal recursive filter, in particular a first order filter. A delayed version of the output signal is subtracted from the input signal. The resulting difference signal is used for motion detection and for smear detection and for determining therefrom a factor k which controls the share of the difference signal which is added to the delayed version of the output signal, resulting in chroma noise reduction.

Advantageously, the inventive features achieve a reduction of the smear effect while maintaining a fairly strong feed back factor for the recursion. In addition, residual colour can be reduced.

In principle, the inventive method is suited for temporally recursive chrominance signal noise reduction, wherein a delayed version of the chrominance output signal is subtracted from the chrominance input signal and the related difference signal multiplied by a variable share factor can be added to said chrominance output signal for achieving different degrees of said noise reduction, including the steps:

calculating from said difference signal a motion representative value and a value representing the presence of a smear effect;

calculating, using said motion representative value and said smear effect related value, said variable factor;

combining said difference signal after having been multiplied by said factor with an essentially frame-delayed version of the chrominance output signal in order to form said noise-reduced chrominance output signal.

In principle the inventive apparatus is suited for temporally recursive chrominance signal noise reduction, in which apparatus a delayed version of the chrominance output signal is subtracted from the chrominance input signal and the related difference signal multiplied by a variable share factor can be added to said chrominance output signal for achieving different degrees of said noise reduction, said apparatus including:

means for calculating from said difference signal a motion representative value and a value representing the presence of a smear effect;

means for calculating, using said motion representative value and said smear effect related value, said variable factor;

means for combining said difference signal after having been multiplied by said factor with an essentially frame-delayed version of the chrominance output signal in order to form said noise-reduced chrominance output signal.

Advantageous additional embodiments of the invention are disclosed in the respective dependent claims.

BRIEF DESCRIPTION OF THE DRAWINGS

Exemplary embodiments of the invention are described with reference to the accompanying drawings, which show in.

DETAILED DESCRIPTION OF PREFERRED EMBODIMENTS

Figure 1:
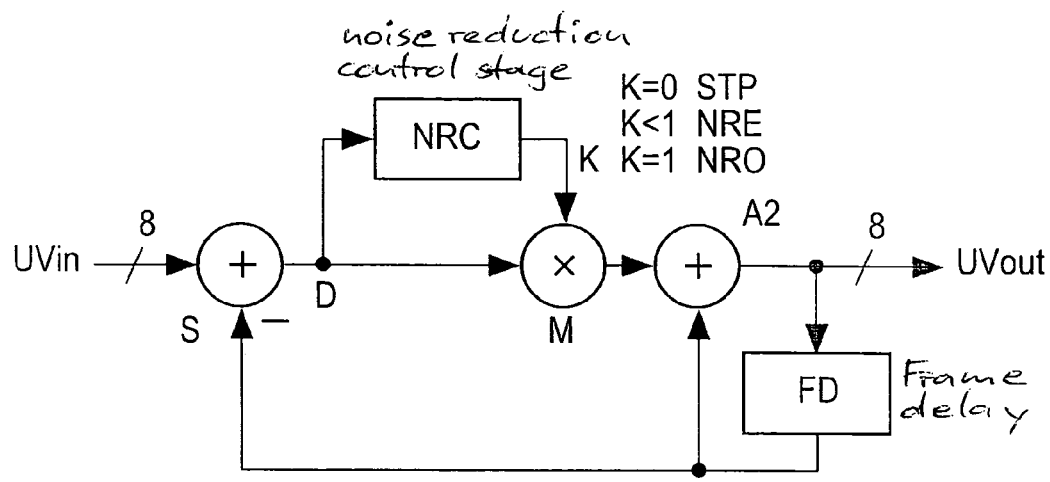
FIG. 1 Simplified functional block diagram for the inventive chroma noise reduction.

In FIG. 1 the chroma input signal $UV_{in}$ is fed to a subtractor S. Its output signal D is multiplied in a multiplier M by factor 'k', which factor can have a value between '1' (or any other constant i.e. maximum value) and '0'. The multiplier output signal is fed to a first input of adder A2. Its output signal represents the (noise-reduced) chroma output signal $UV_{out}$. Output signal $UV_{out}$ passes through a frame delay FD and is fed to the second input of adder A2 as well as to the subtractive input of subtractor S. From the output signal of that subtractor the above factor 'k' is calculated in a noise reduction control stage NRC.

In case of k=1, the noise reduction effect is switched off (NRO). If k<1 the noise reduction is effective (NRE). If k=0, a still or frozen chroma signal $UV_{out}$ is output (STP).

In principle, the invention uses a first order temporal recursive filter. The noise filter includes a frame delay to get access to the previous frame and an adder that mixes the input signal and the delayed signal. Coefficient 'k' controls the mixer, leading to more or less strength of noise filtering. The motion-adaptive control block NRC will increase the coefficient k occasionally in case of movement in a certain area of the picture, to get rid of temporal artefacts created by the temporal recursive noise filter.

In principle, the invention carries out the following calculation for noise reduction:

$$Uv_{out}(n)=k*UV_{in}(n)+(1-k)*UV_{out}(n-1)$$

where 'n' is the number of a current frame.

Within the chroma input signal $UV_{in}$, the signals $U_{in}$ and $V_{in}$ are multiplexed. Therefore the processing is running on double chroma pixel frequency. The same is true for the output signal $UV_{out}$.

Figure 2:
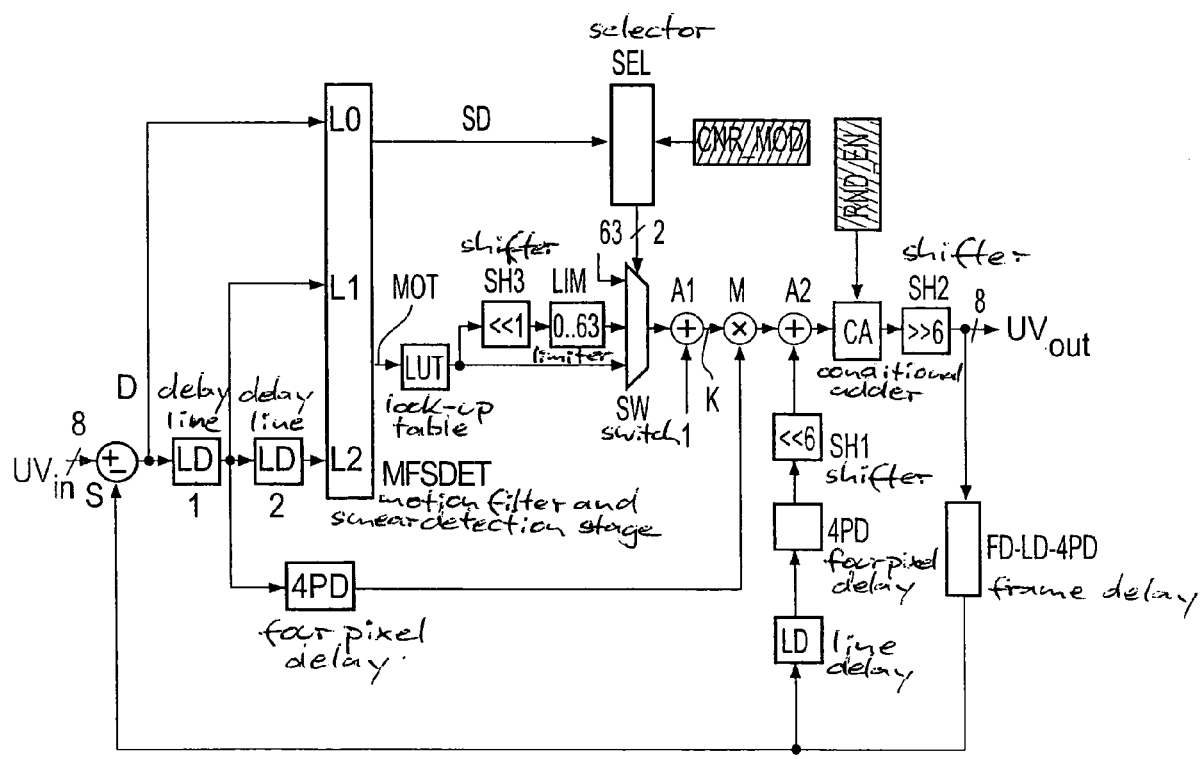
FIG. 2 More detailed block diagram for the inventive chroma noise reduction.

In FIG. 2 the chroma input signal $UV_{in}$ (8 bit, e.g. unsigned) is fed to a subtractor S. Its output signal D is delayed by a line delay LD1 and a four-pixel delay 4PD ('pixel delay' means a delay by one U pixel and by one V pixel) and is multiplied in a multiplier M by factor 'k', which factor can have a value between '1' and '0' like in FIG. 1. The multiplier output signal is fed to a first input of adder A2. Its output signal passes through a conditional adder CA and a shifter SH2 and thereafter represents the (noise-reduced) chroma output signal $UV_{out}$ (8 bit, e.g. unsigned). Signal $UV_{out}$ passes through a frame delay FD, the delay of which is shortened correspondingly by a line delay and four pixel delays, and is fed to the subtractive input of subtractor S, as well as to the second input of adder A2 via a line delay LD, a four-pixel delay 4PD and a shifter SH1.

Shifter SH1 can perform a 6-bit left shift whereas shifter SH2 can perform a 6-bit right shift. The optional conditional adder CA performs a rounding operation, e.g. by adding value '63', if its input signal has an amplitude value smaller than e.g. '8192' and if it is enabled by signal RND_EN.

The output signal of line delay LD1 is further delayed by a second line delay LD2. The output signals of subtractor S, the first line delay LD1 and the second line delay LD2 are fed to respective inputs L0, L1 and L2 of a motion filter and smear detection stage MFSDET.

The motion filter and smear detection stage outputs a smear detection signal SD and a motion detection signal MOT. Signal SD is combined in a selector SEL with a colour noise reduction mode signal CNR_MOD and outputs a switch control signal for a switch SW according to the following table:

| SD | CNR_MOD(MSB) | CNR_MOD(LSB) | output |
|----|--------------|--------------|--------|
| 0  | 0            | 0            | 0      |
| 1  | 0            | 0            | 0      |
| 0  | 0            | 1            | 0      |
| 1  | 0            | 1            | 1      |
| 0  | 1            | 0            | 0      |
| 1  | 1            | 0            | 2      |
| 0  | 1            | 1            | 2      |
| 1  | 1            | 1            | 2      | wherein in case of output '0' the output signal of a look-up table LUT (e.g. 6-bit input, 6-bit output), which provides a preliminary k factor, is switched to the first input of adder A1, in case of output '1' the output signal of a limiter LIM is switched to the first input of adder A1 and in case of output '2' a pre-determined value of e.g. '63' is switched to the first input of adder A1.

The motion detection signal MOT is fed to the input of look-up table LUT and, optionally via a third shifter (e.g. left shift by one bit), to the input of limiter LIM.

In adder A1 the value '1' can be added to the output signal of switcher SW. The output signal of adder A1 represents the above-mentioned value 'k'.

Figure 3:
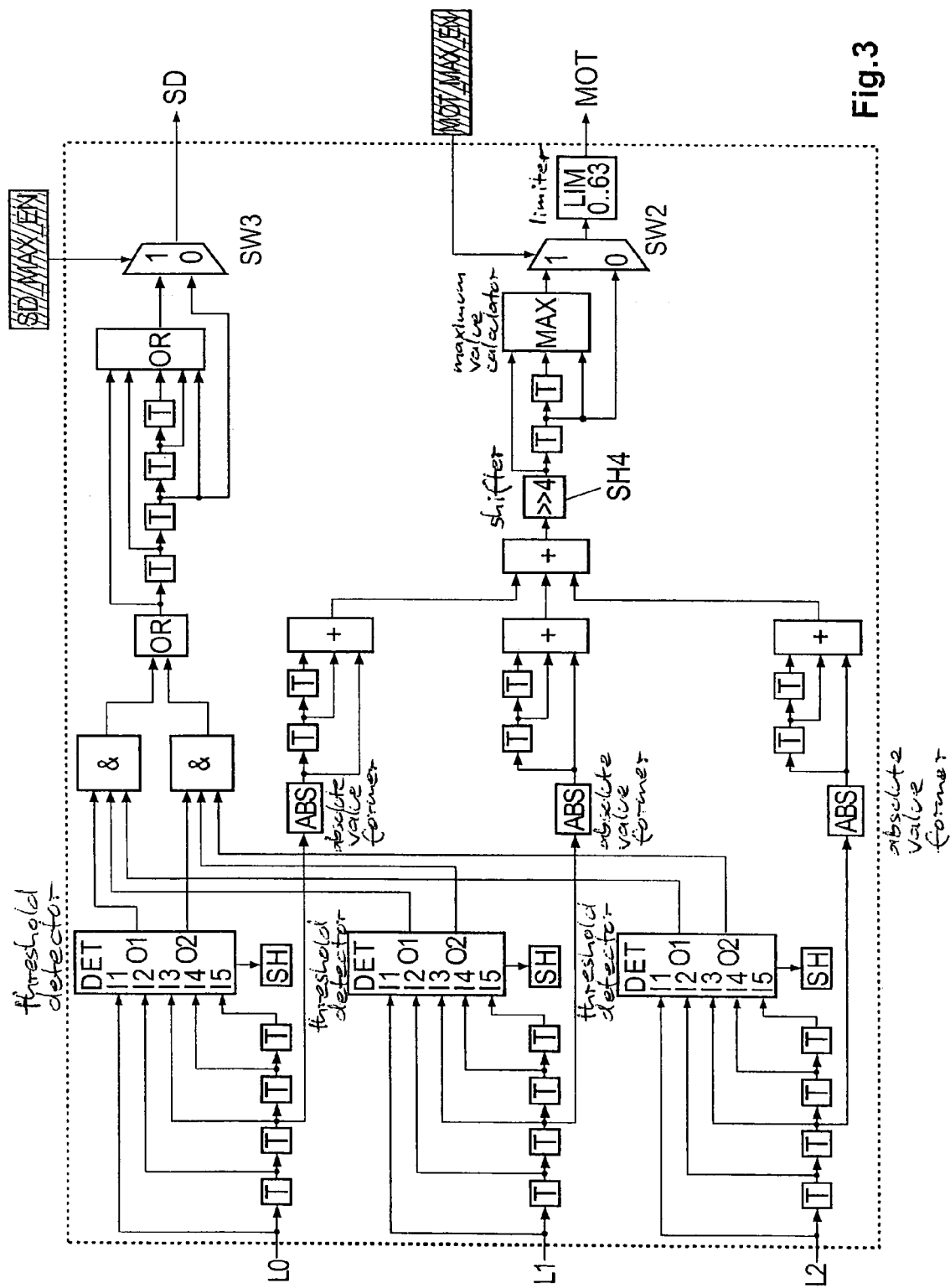
FIG. 3 More detailed circuitry for motion and smear detection.

In FIG. 3 the motion filter and smear detection stage MFSDET is shown in more detail. Its main functions are described below.

N*M Filter for Motion Representative Signal

A motion representative value is gained by calculating in each case the intermediate sum of e.g. three (or N) succeeding U or V, respectively, chroma pixel absolute frame difference values (which are provided by subtractor S) in a line and by adding the N intermediate sum values of e.g. three (or M) vertically adjacent chroma pixel values, i.e. of e.g. two vertically adjacent chroma pixels in a given field and the intermediate chroma pixel of the adjacent field, which sum value is thereafter e.g. four times right shifted and represents the output of a two-dimensional low pass filter of N*M size.

The order of processing can also be exchanged by first adding pixel values in vertical direction and then adding the results in horizontal direction.

Such filtering facilitates separation of noise and motion information. However, as a side effect of this low pass filter the effective slope steepness of the motion signal is actually degraded by the filter step response characteristic. For restoration of this motion signal, the filter delay can be compensated for by means of advancing or delaying the actual motion information signal in respect to the L0, L1, L2 input signal and thereby in respect to the original video input signal. Advantageously the output motion information value is at least as effective to motion artefacts prevention as it was before it entered the N*M filter. Therefore the motion signal is to be advanced or delayed depending on slope direction. The slope direction is the 1st derivation of the motion signal.

In FIG. 3, each one of the motion filter and smear detection stage input signals L0, L1 and L2 passes through a chain of four pixel delays to a threshold detector DET. In each case DET receives the L0, L1 or L2, respectively, input signal and the corresponding 1 to 4 times delayed versions of that input signal at inputs I1 to I5, respectively.

From the L0, L1, L2 output signal of the second pixel delay the absolute value ABS is formed in each case. That value is in each case added to a one-pixel delayed version of that value and to a two-pixel delayed version of that value. The three resulting sum values are added and four times right shifted in shifter SH4.

Search of Maximum N*M Filter Output

A filter slope dependent compensation direction can be used. For such purpose the current maximum value of e.g. three motion representative signal values occurring (preceding as well as following) within the filter length range is determined in a maximum value calculator MAX. Thereby a motion slope is always detected as soon as possible and as late as necessary. The motion detector output signal is therefore as effective as the motion detector input signal. Depending on a motion maximum enable flag MOT_MAX_EN this feature can be switched on or off in switcher SW2. Finally the motion representative signal MOT can be limited to a range of e.g. 0 to 63.

Smear-Related Adaptation of the K Factor to Reduce Artefacts

An artefact that can occur in 3D (i.e. including temporal processing) noise reduction algorithms is smear. This will happen if a fairly bright or coloured object moves over background picture content having a different brightness or colour. Especially if the brightness or colour of the area consists of flat or equal-amplitude pixel values, smearing will be visible at the border of the object. However, such kind of picture content is not detectable in a sufficiently reliable way by the above-described motion detection. Therefore an additional signal is to be determined which can be used to correct the k factor in this situation.

Advantageously the k factor correction can be calculated by making use of the above-described frame difference signal or by making also use of part of the pixel delays. If the presence of a smear effect is detected the k factor can be modified by setting 'k' to '1' or to 'k*2'. The advantage of avoiding smear is more important than the disadvantage of reduced noise reduction efficiency for this area, because of applying the increased k factor.

Within detector DET the five input signals are in each case compared to a threshold value SH. Each one of the detectors outputs the signals O1 and O2:

O1=I1>=SH && I2>=SH && I3>=SH && I4>=SH && I5>=SH,
O2=I1<=−SH && I2<=−SH && I3<=−SH && I4<=−SH && I5<=−SH, both written in the C++ programming language notation. The three O1 output signals are logically AND combined and the three O2 output signals are logically AND combined. The two resulting output signals are logically OR combined, thereby providing the smear detection signal SD in principle. However, in order to match the required temporal position of SD it further passes two pixel delays. Like with motion maximum enable flag MOT_MAX_EN, the smear search area can be extended horizontally by ±2 pixels upon applying a smear maximum enable flag SD_MAX_EN to switch SW3 whereby the OR result and a 1 to 4 times delayed version of it are OR combined, thereby generating signal SD.

Smear is detected, if the value of all 5*3 chroma pixels involved (5 consecutive pixels of 3 consecutive chroma lines in a field, e.g. lines 3, 5 and 7) is either greater or equal than the positive threshold 'TH', or smaller than the negative threshold 'TH'.

The order of processing can also be exchanged by first comparing pixel values in vertical direction and then AND combining the results in horizontal direction.

The effective or final k factor used according to FIG. 2 for mixer M is also depending on the smear detection value SD and the CNR_MOD flag (CNR=colour noise reduction):

| CNR_MOD | CNR | k |
|---|---|---|
| 0 | on | k<<=k (i.e. k remains as it is) |
| 1 | on | k<<=k*2 if smear detected, else k<<=k |
| 2 | off | k<<=1 if smear detected, else k<<=k |
| 3 | off | k<<=1 (i.e. k is fixed) |

Special Rounding for Chroma Pixel Values

In case of k<<1 (strong noise reduction) it may happen due to rounding errors in the previous calculations that there is still visible residual colour on the display, though the original input signal is a black and white picture. A special rounding in conditional adder CA solves this problem if flag RND_EN is enabled.

Suppose that 'x' is the chroma signal before rounding (valid range is typically −127.99<=x<=+127.99) and that 'y' is the chroma signal after rounding (valid range is typically −127<=x<=+127). The rounding applied is:
if x<0 then y=integer(x)+1
else y=integer(x).

What is claimed is:

1. Method for temporally recursive chrominance signal noise reduction, wherein a delayed version of the chrominance output signal is subtracted from the chrominance input signal and the related difference signal multiplied by a variable share factor can be added to said chrominance output signal for achieving different degrees of said noise reduction, including the steps:
calculating from said difference signal a motion representative value and a value representing the presence of a smear effect;
calculating, using said motion representative value and said smear effect related value, said variable factor;
combining said difference signal after having been multiplied by said factor with an essentially frame-delayed version of the chrominance output signal in order to form said noise-reduced chrominance output signal.

2. Method according to claim 1, wherein said motion representative value and said smear effect related value are calculated for a current pixel position by using the values of two-dimensional pixel arrays surrounding and including said current pixel, wherein when combining the chroma values of the related two-dimensional pixel array for a current motion representative value the absolute values are combined, and when combining the chroma values of the related two-dimensional pixel array for a current smear effect related value the thresholded chroma values only are combined.

3. Method according to claim 1, wherein the width of the running motion representative value is extended by deriving each one of these values by forming the maximum of a current motion representative value and preceding and succeeding motion representative values.

4. Method according to claim 1 wherein, before being output, the chroma pixel values x of said noise-reduced chrominance output signal are rounded:
if x<0 then x=integer(x)+1 else y=integer(x).

5. Method according to claim 1 wherein, when a smear effect is detected, said factor is doubled.

6. Apparatus for temporally recursive chrominance signal noise reduction, in which apparatus a delayed version of the chrominance output signal is subtracted from the chrominance input signal and the related difference signal multiplied by a variable share factor can be added to said chrominance output signal for achieving different degrees of said noise reduction, said apparatus including:
means for calculating from said difference signal a motion representative value and a value representing the presence of a smear effect;
means for calculating, using said motion representative value and said smear effect related value, said variable factor;
means for combining said difference signal after having been multiplied by said factor with an essentially frame-delayed version of the chrominance output signal in order to form said noise-reduced chrominance output signal.

7. Apparatus according to claim 6, wherein said motion representative value and said smear effect related value are calculated for a current pixel position by using the values of two-dimensional pixel arrays surrounding and including said current pixel, wherein when combining the chroma values of the related two-dimensional pixel array for a current motion representative value the absolute values are combined, and when combining the chroma values of the related two-dimensional pixel array for a current smear effect related value the thresholded chroma values only are combined.

8. Apparatus according to claim 6, wherein the width of the running motion representative value is extended by deriving each one of these values by forming the maximum of a current motion representative value and preceding and succeeding motion representative values.

9. Apparatus according to claim 6 wherein, before being output, the chroma pixel values x of said noise-reduced chrominance output signal are rounded:

if x<0 then y=integer(x)+1 else y=integer(x).

10. Apparatus according to claim 6 wherein, when a smear effect is detected, said factor is doubled.

* * * * *